US012546531B1

(12) United States Patent
Pierce et al.

(10) Patent No.: US 12,546,531 B1
(45) Date of Patent: Feb. 10, 2026

(54) SYSTEMS FOR LOCATING A LIGHTING ASSEMBLY IN AN APPLIANCE

(71) Applicant: Haier US Appliance Solutions, Inc., Wilmington, DE (US)

(72) Inventors: Andrew Pierce, Louisville, KY (US); Adrián Levi González Rostro, Querétaro (MX)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/058,090

(22) Filed: Feb. 20, 2025

(51) Int. Cl.
*F25D 27/00* (2006.01)
*F21V 33/00* (2006.01)
*F21W 131/305* (2006.01)

(52) U.S. Cl.
CPC .......... *F25D 27/00* (2013.01); *F21V 33/0044* (2013.01); *F21W 2131/305* (2013.01)

(58) Field of Classification Search
CPC .. F25D 27/00; F25D 27/005; F21W 2131/305
See application file for complete search history.

(56) References Cited

U.S. PATENT DOCUMENTS

| | | | | |
|---|---|---|---|---|
| 4,966,004 A | | 10/1990 | Midlang et al. | |
| 10,215,475 B2 | | 2/2019 | Chow et al. | |
| 11,708,970 B2 | | 7/2023 | Ma et al. | |
| 2012/0106129 A1 | * | 5/2012 | Glovatsky | F25D 23/067 362/92 |
| 2017/0336128 A1 | * | 11/2017 | de Cavalcanti | F25D 17/042 |
| 2018/0149412 A1 | * | 5/2018 | Cakirca | F25D 23/08 |
| 2018/0149413 A1 | * | 5/2018 | Cakirca | F25D 23/028 |
| 2018/0149414 A1 | * | 5/2018 | Cakirca | F25D 23/067 |
| 2021/0088271 A1 | * | 3/2021 | Hanson | F21V 23/06 |
| 2023/0014764 A1 | | 1/2023 | Song | |
| 2023/0272969 A1 | * | 8/2023 | Ahmed | F21V 33/0044 362/92 |

FOREIGN PATENT DOCUMENTS

| | | | | | |
|---|---|---|---|---|---|
| CN | 107044763 A | * | 8/2017 | F25D 27/00 |
| CN | 107525036 A | * | 12/2017 | F21V 17/164 |
| CN | 112964018 A | * | 6/2021 | F25D 27/00 |
| CN | 220624565 U | | 3/2024 | |
| KR | 20120000288 A | * | 1/2012 | F25D 23/065 |

* cited by examiner

*Primary Examiner* — Alexander K Garlen
(74) *Attorney, Agent, or Firm* — Dority & Manning, P.A.

(57) ABSTRACT

A refrigerator includes a cabinet and a liner disposed within the cabinet. The liner defines a keyed aperture and a lateral slot. The refrigerator includes a lighting assembly disposed within the cabinet. The lighting assembly includes a housing that includes a body extending laterally between a first end and a second end. The housing includes a rim coupled with the body. The rim extends laterally between the first end and the second end. The rim is configured to be received by the keyed aperture. The rim received by the keyed aperture restricts transverse movement of the housing. The housing includes a lateral locator extending from the body toward the liner. The lateral locator is configured to be received by the keyed aperture to restrict lateral movement of the housing. The refrigerator includes a light coupled with the housing. The light is directed into the cabinet.

18 Claims, 6 Drawing Sheets

SYSTEMS FOR LOCATING A LIGHTING ASSEMBLY IN AN APPLIANCE

FIELD OF THE INVENTION

The present subject matter relates generally to appliances, and more particularly to systems and methods for managing assembly of lighting within refrigerator appliances.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

In order to maintain the low temperature within the chilled chamber, refrigerator appliances typically include insulation between a liner and an outer housing or cabinet, where the liner defines the chilled chamber and the cabinet defines an outermost surface of the refrigerator appliance in direct contact with the ambient atmosphere (e.g., which is usually at room temperature) around the refrigerator appliance.

Refrigerator appliances also typically include various lighting components for increasing visibility within the cabinet. The lighting components can protrude into the cabinet and take up valuable space. The lighting components can protrude into the cabinet and also define unsightly gaps. Current systems and methods for mounting such lighting components may present certain disadvantages. For example, there may be gaps between the light and the liner within the cabinet that provide an unfinished appearance.

Accordingly, improved systems and methods for managing assembly of lighting components within refrigerator appliances would be useful.

BRIEF DESCRIPTION OF THE INVENTION

Aspects and advantages of the invention will be set forth in part in the following description, or may be apparent from the description, or may be learned through practice of the invention.

In one example embodiment, a refrigerator includes a cabinet and a liner disposed within the cabinet. The liner defines a keyed aperture and a lateral slot. The refrigerator includes a lighting assembly disposed within the cabinet. The lighting assembly includes a housing that includes a body extending laterally between a first end and a second end. The housing includes a rim coupled with the body. The rim extends laterally between the first end and the second end. The rim is configured to be received by the keyed aperture. The rim received by the keyed aperture restricts transverse movement of the housing. The housing includes a lateral locator extending from the body toward the liner. The lateral locator is configured to be received by the keyed aperture to restrict lateral movement of the housing. The refrigerator includes a light coupled with the housing. The light is directed into the cabinet.

In another exemplary embodiment, a lighting assembly for a refrigerator. The refrigerator includes a cabinet, a liner disposed within the cabinet. The liner defines a keyed aperture. The lighting assembly includes a housing disposed within the cabinet. The housing includes a body extending laterally between a first end and a second end. The housing includes a rim coupled with the body. The rim extends laterally between the first end and the second end. The rim is configured to be received by the keyed aperture. The rim that is received by the keyed aperture remains static relative to the liner in the transverse direction. The housing includes a lateral locator extending from the body toward the liner. The lateral locator is configured to be received by the keyed aperture remains static relative to the liner in the lateral direction. The lighting assembly includes a light coupled with the housing. The light is directed into the cabinet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
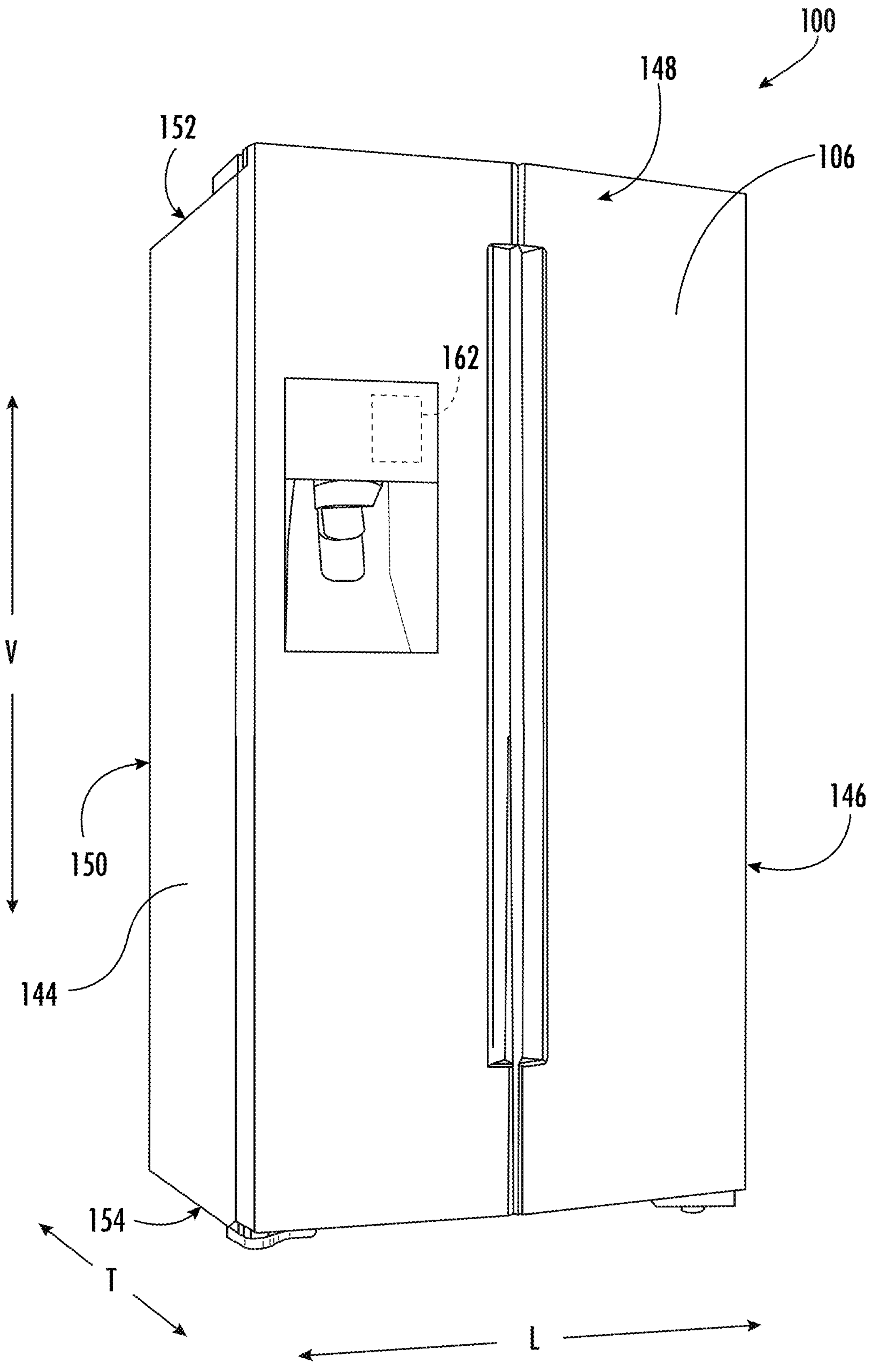
FIG. 1 provides a front perspective view of an example refrigerator appliance, according to one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," "bottom" are used with reference to the perspective of a user accessing the refrigerator appliance. For example, a user stands in front of the refrigerator to open the doors and reaches into the food storage chamber(s) to access items therein.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
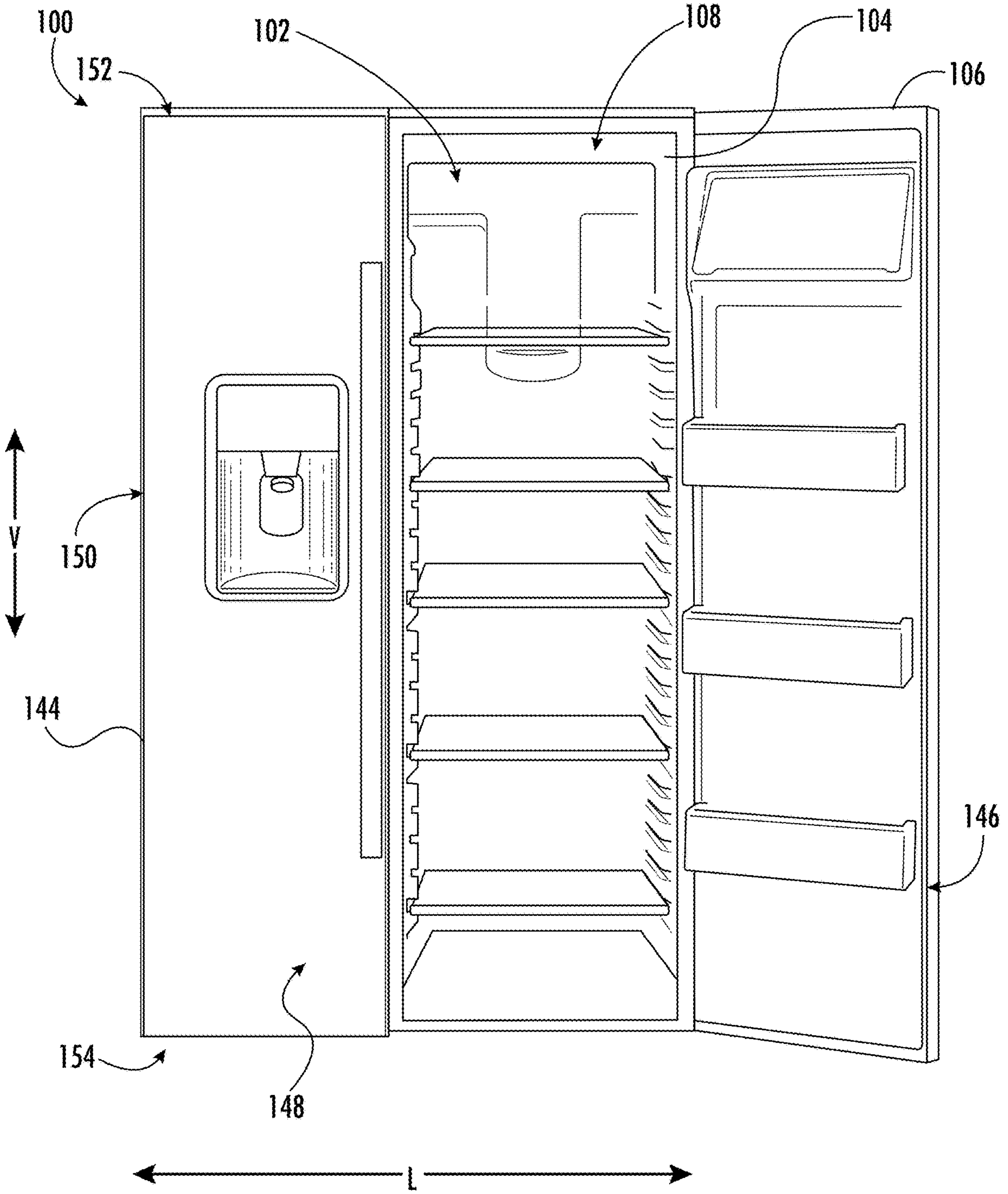
FIG. 2 provides a front view of the refrigerator appliance of FIG. 1.
Figure 3:
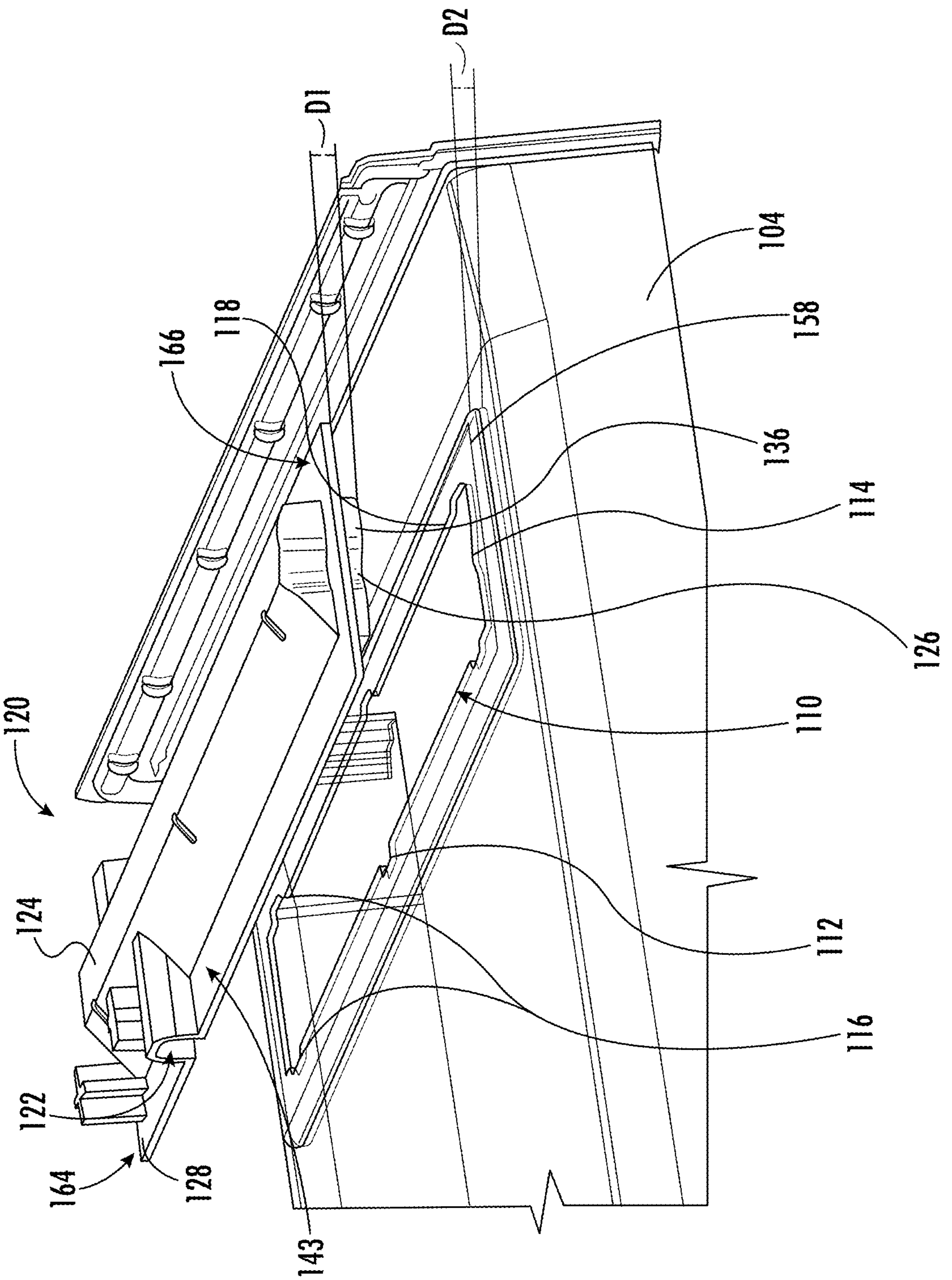
FIG. 3 provides an exploded view of a lighting assembly and a liner of the refrigerator appliance of FIG. 1.
Figure 4:
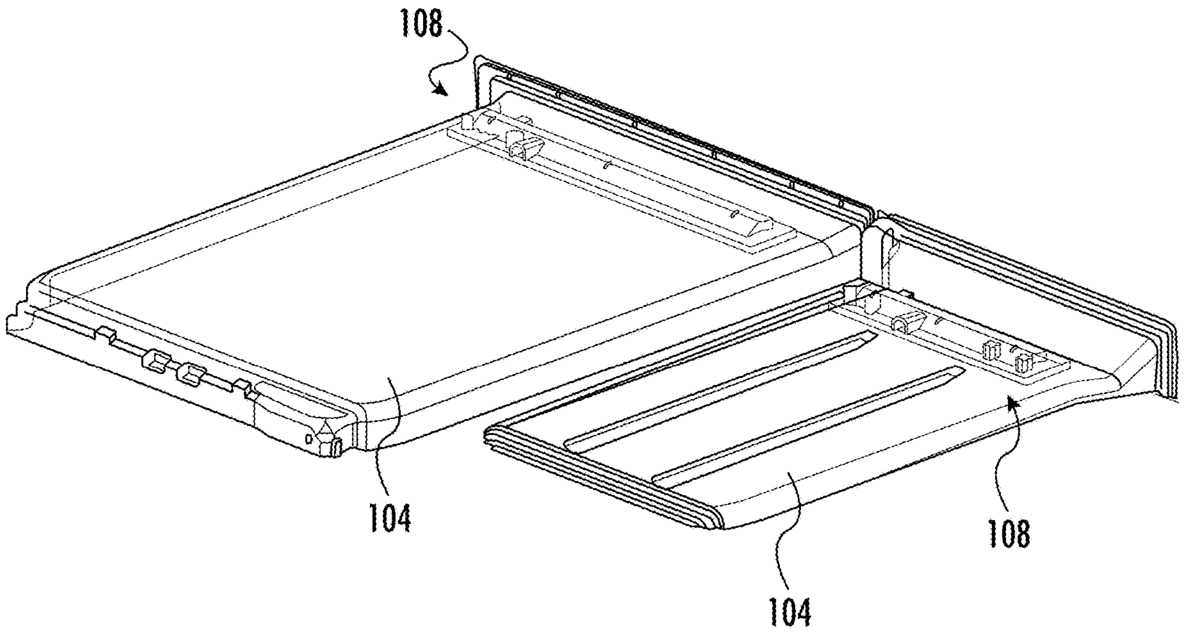
FIG. 4 provides a rear perspective view of the lighting assembly of the refrigerator appliance of FIG. 1.

FIG. 1 is a front perspective view of an exemplary embodiment of a refrigerator appliance 100. FIG. 2 is a front view of the refrigerator appliance 100 with a door 106 that is open. FIG. 3 is a rear exploded view of the refrigerator appliance 100 with a liner 104 and a lighting assembly 108. Refrigerator appliance 100 extends between a top 152, or top side, and a bottom 154, or bottom side, along a vertical direction V. Refrigerator appliance 100 also extends between a first side 144 and a second side 146 along a lateral direction L which is perpendicular to the vertical direction V. Refrigerator appliance 100 also extends between a front side 148 and a rear side 150 along a transverse direction T which is perpendicular to the lateral direction L which is perpendicular to the vertical direction V.

Refrigerator appliance 100 includes a cabinet 102. Furthermore, the refrigerator appliance 100 may include a refrigerator portion and a freezer portion. Additionally, or alternatively, the refrigerator appliance 100 may be referred to as a side-by-side refrigerator or a refrigerator that is divided horizontally into a top portion and a bottom portion. Using the teachings disclosed herein, one of skill in the art will understand that the present technology can be used with other types of refrigerators or a freezer appliance as well. Consequently, the description set forth herein is for illustrative purposes only and is not intended to limit the technology in any aspect.

Refrigerator doors 106 are each rotatably hinged to an edge of the cabinet 102 for accessing refrigerated items such as food items, for example. It should be noted that while two doors 106 in a "French door" configuration are illustrated, any suitable arrangement of doors utilizing one, two or more doors is within the scope and spirit of the present disclosure.

Using the teachings disclosed herein, one of skill in the art will understand that the present subject matter can be used with other household appliances, including other types of refrigerators such as a standalone refrigerator or freezer only unit (e.g., a column unit), a refrigerator/freezer combination, side-by-side, bottom mount, compact, and any other style or model of refrigerator appliance. Accordingly, other configurations of refrigerator appliance 100 could be provided, it being understood that the configurations shown in the accompanying figures and the description set forth herein are by way of example for illustrative purposes only.

The refrigerator appliance 100 includes a liner 104 disposed within the cabinet 102. The liner 104 may be referred to as an inner wall or surface. The liner 104 may be made of a durable, easy-to-clean material like plastic or metal, for example. The liner 104 may be sealed with the cabinet 102 to hold insulation materials within the refrigerator walls. The liner 104 may further as a protective barrier between refrigerating components (e.g., an evaporator, a compressor, etc.) and where refrigerated items are stored to prevent any components from being exposed to moisture, spills, or physical damage. Additionally, or alternatively, the liner 104 may be made from smooth, non-porous materials. The liner 104 may be designed to be easy to wipe down and resistant to stains and odors. Further, the liner 104 provides a clean, finished look to the interior of the refrigerator appliance 100, which is visually appealing and user-friendly. The liner 104 is described in greater detail below.

The refrigerator appliance 100 may include a controller 162. Operation of the refrigerator appliance 100 can be regulated by a controller 162 that is operatively coupled to the lighting assembly 108. The refrigerator appliance 100 may include an interface panel (not shown) that provides selections for user manipulation of the operation of refrigerator appliance 100 to modify environmental conditions therein, such as the light produced by a light 160 of the lighting assembly 108, etc. Operation of the refrigerator appliance 100 can be regulated by the controller 162, e.g., controller 162 may regulate operation of various components of the refrigerator appliance 100 in response to programming and/or user manipulation of the user interface panel.

The controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 162 as disclosed herein are capable of and may be operable to perform any methods and associated method steps as may be disclosed herein.

The controller 162 may be positioned in a variety of locations throughout refrigerator appliance 100. In the illustrated embodiment, the controller 162 may be located within the door 106. In such an embodiment, input/output ("I/O") signals may be routed between the controller and various operational components of refrigerator appliance 100. In one embodiment, the user interface panel may represent a general purpose I/O ("GPIO") device or functional block. In one embodiment, the user interface may include input components, such as one or more of a variety of electrical, mechanical or electro-mechanical input devices including rotary dials, push buttons, and touch pads. The user interface may include a display component (not shown), such as a digital or analog display device designed to provide operational feedback to a user. The user interface and the lighting assembly 108 may be in communication with the controller via one or more signal lines or shared communication busses.

With reference to FIGS. 3 through 7, the refrigerator appliance 100 includes lighting assembly 108 disposed within the cabinet 102. The lighting assembly 108 is generally coupled with the liner 104. The lighting assembly 108 includes a housing 120 operably coupled with the liner 104. The housing 120 includes a body 128 that extends between a first end 164 and a second end 166. The body 128 extends laterally between the first end 164 and the second end 166. The body 128 may be generally planar and extend along a transverse-lateral plane, such that the body 128 defines a top surface 143 and a bottom surface 142 opposite the top surface 143. The body 128 defines an access port 122. The access port 122 may provide space for signal lines from the controller 162 to reach a light 160. The access port 122 may be generally U-shaped, as illustrated in FIG. 3. Additionally, or alternatively, the access port 122 may be an aperture.

Further, the housing 120 may include a reinforcement rib 156 coupled with the body 128 to increase rigidity of the housing 120.

The housing 120 of the lighting assembly 108 also includes a rim 136 coupled with the body 128 and extending outwardly therefrom. The rim 136 may extend vertically downward from the bottom surface 142 of the body 128. The rim 136 may be noncontinuous, as illustrated in the example embodiment of FIG. 5. The rim 136 defines a notch 126 proximal to the first end 164 of the body 128, as illustrated in the example embodiments. Additionally, or alternatively, the notch 126 may be defined proximal to the second end 166 of the body 128. The rim 136 may be curved laterally inward at the notch 126. Additionally, or alternatively, the rim 136 may be prismatic at the notch 126. The housing 120 further includes a chamber 124 extending from the body 128. The chamber 124 may be configured to hold signal lines, wires, or the like that allow the controller 162 to communicatively coupled with the light 160.

Figure 5:
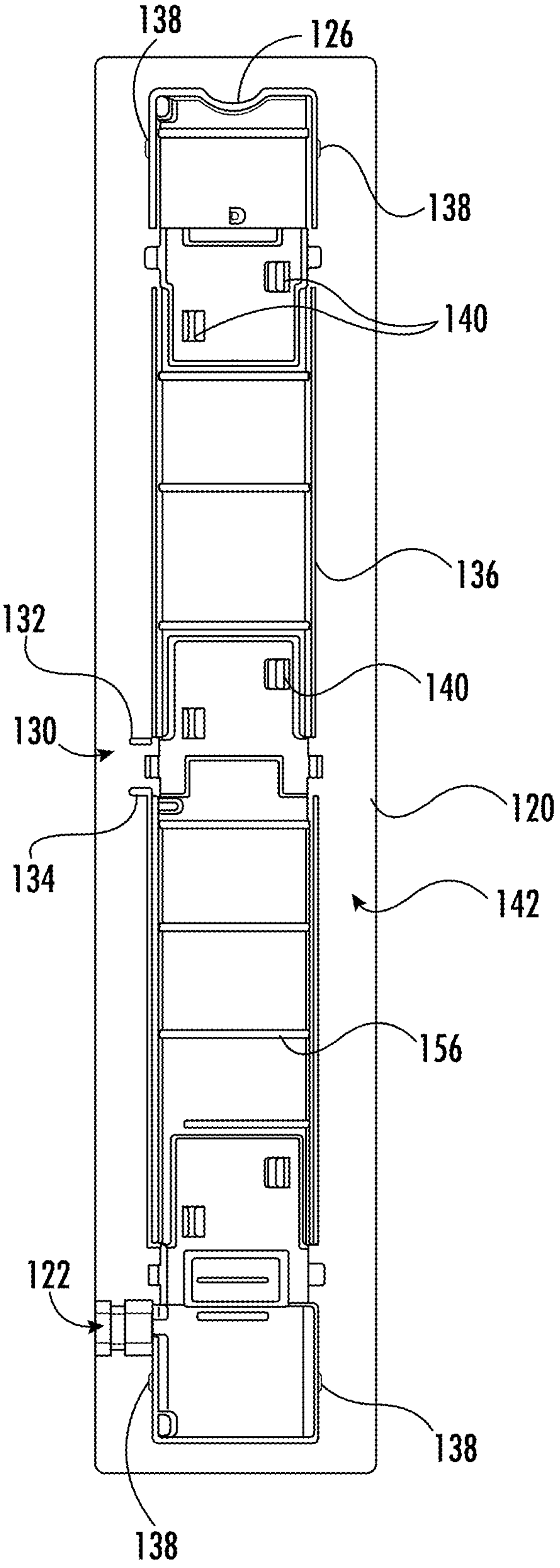
FIG. 5 provides a bottom perspective view of a housing of the light assembly of FIG. 3.
Figure 6:
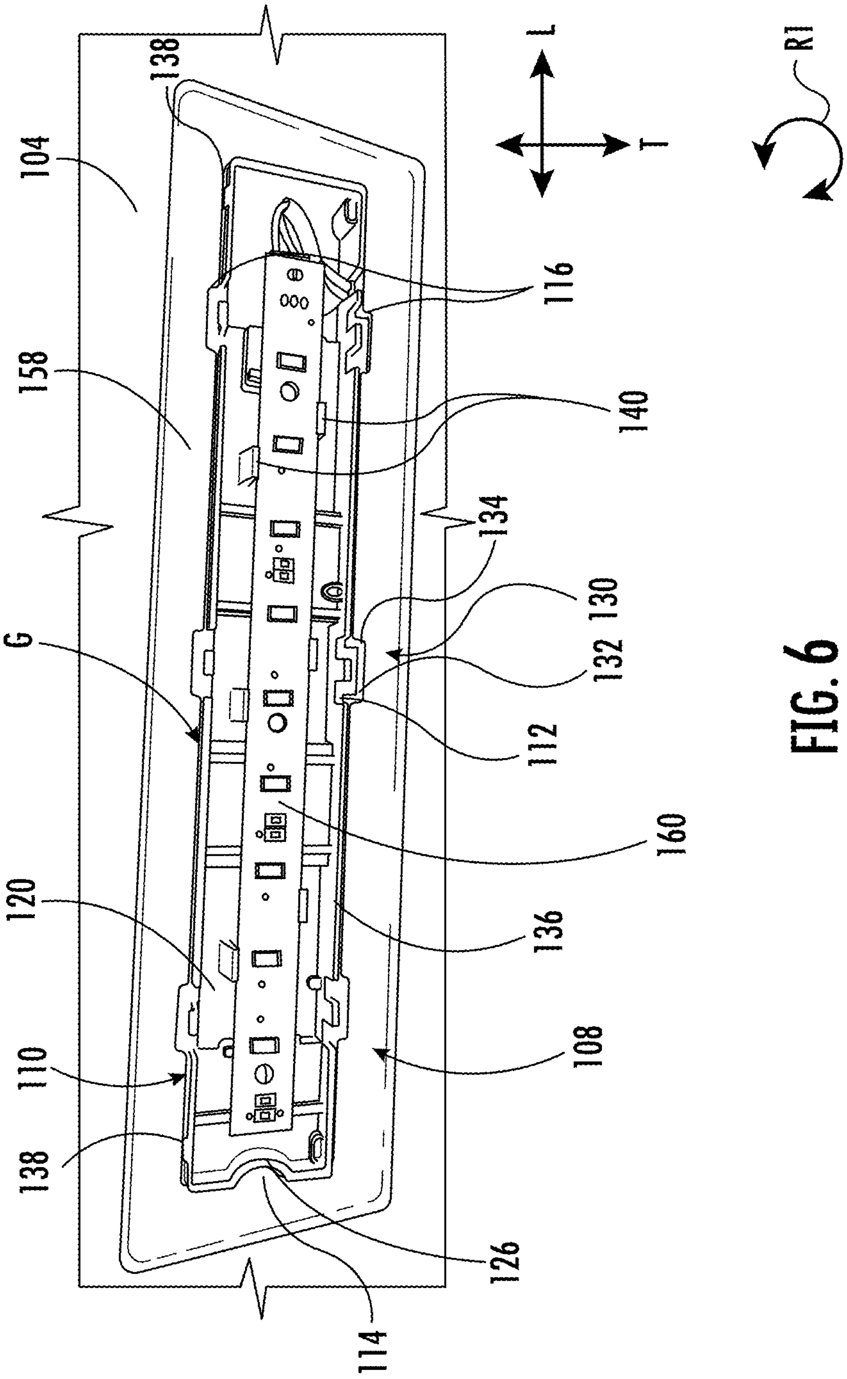
FIG. 6 provides bottom perspective view of the lighting assembly within the refrigerator appliance of FIG. 1.

The rim 136 of the housing 120 includes a projection 138 extending outwardly from the rim 136. As illustrated in FIGS. 5 and 6, the projection 138 may extend transversely away from the rim 136 toward the liner edge 118 of the liner 104. The projection 138 may engage, or abut, the liner 104 at the liner edge 118. The projection 138 may assist in allowing the lighting assembly 108 to remain static along the vertical direction V. For example, the projection 138 may restrict, or prevent, upward vertical movement of the housing 120. Additionally, or alternatively, the body 128 of the housing 120 may engage, or abut, the liner 104 opposite the projection 138 along the vertical direction V. The body 128 may assist in allowing the lighting assembly 108 to remain static along the vertical direction V. For example, the projection 138 may restrict, or prevent, downward vertical movement of the housing 120. Additionally, or alternatively, gravity, or a gravitational force, may assist in allowing the lighting assembly 108 to remain static along the vertical direction V.

The lighting assembly 108 includes a light 160 coupled with the housing 120. The light 160 may be formed by an LED board having LEDs, for example. Additionally, or alternatively, the light 160 may be an incandescent, a fluorescent, a fiber-optic light, or the like. The housing 120 may include a clip 140 coupled with the body 128. The clip 140 may operably couple with the light 160 to retain the light 160 relative to the lighting assembly 108.

The housing 120 also includes a lateral locator 130 coupled with the body 128. Additionally, or alternatively, the lateral locator 130 may be coupled with the bottom surface 142 of the body 128 and external vertically downward therefrom. The lateral locator 130 may include a first tab 132 coupled with the body 128 and a second tab 134 coupled with the body 128 and spaced from the first tab 132. The first tab 132 and the second tab 134 of the lateral locator 130 may be spaced from the rim 136, as illustrated in the example embodiments of the figures. Additionally, or alternatively, the first tab 132 and the second tab 134 may be directly coupled with the rim 136. The housing 120 is described in greater detail below.

Referring again to the liner 104, the liner 104 defines a keyed aperture 110. The liner 104 includes a liner edge 118 that specifically defines the keyed aperture 110. The keyed aperture 110 may be defined by the liner 104 proximal to the top side 152, as illustrated. Additionally, or alternatively, the keyed aperture 110 may be defined proximal to the first side 144, the second side 146, the front side 148, the top side 152, and/or the bottom side 154. The keyed aperture 110 is configured to receive the rim 136 of the housing 120. Additionally, or alternatively, the rim 136 operably extends through the keyed aperture 110. The projection 138 of the rim 136, at the first end 164 and the second end 166 of the body 128, that is received by the keyed aperture 110 allows the housing 120 to remain static in the transverse direction T. The projection 138 of the rim 136, at the first end 164 and the second end 166 of the body 128, that is received by the keyed aperture 110 may engage, or abut, the liner edge 118 within the keyed aperture 110. Further, the projection 138 of the rim 136, at the first end 164 and the second end 166 of the body 128, that is received by the keyed aperture 110 allows the housing 120 to remain static along a first rotational axis R1. The first rotational axis R1 may be a vertical rotational axis. Additionally, or alternatively, the projection 138 of the rim 136, at the first end 164 and second end 166 of the body 128, that is received by the keyed aperture 110 assists in allowing the housing 120 to remain static along the transverse direction T. The projection 138 of the rim 136, at the first end 164 and the second end 166 of the body 128, that is received by the keyed aperture 110 may engage, or abut, the liner edge 118 within the keyed aperture 110. For example, during assembly or manufacture of the refrigerator appliance 100, the keyed aperture 110 may receive the rim 136 at the first end 164 and the second end 166 to transversely and rotatably align the lighting assembly 108 with the liner 104 to ensure the lighting assembly 108 properly couples with the liner 104.

The liner edge 118 also defines a lateral slot 112 that extends from the keyed aperture 110. Additionally, or alternatively, the lateral slot 112 may be a portion of the keyed aperture 110. The lateral slot 112 is configured to receive the lateral locator 130. More specifically, the lateral slot 112 is configured to receive the first tab 132 and the second tab 134. Additionally, or alternatively, the first tab 132 and the second tab 134 of the lateral locator 130 operably extend through the lateral slot 112. The lateral locator 130 that is received by the lateral slot 112 allows the housing 120 to remain static along the lateral direction L. For example, during assembly or manufacture of the refrigerator appliance 100, the lateral slot 112 may receive the first tab 132 and the second tab 134 of the lateral locator 130 to laterally align the lighting assembly 108 with the liner 104 to ensure the lighting assembly 108 properly couples with the liner 104. The rim 136 received by the keyed aperture 110 and the lateral locator received by the lateral slot 112 allow for a gap distance G between the housing 120 and the liner 104 to be minimized. For example, the gap distance G may be about 0 inches.

With continued reference to the liner 104, the liner 104 may include a protruding edge 114 extending laterally inward from the liner edge 118. The protruding edge 114 may be configured to be received by the notch 126 of the rim 136. Additionally, or alternatively, the protruding edge 114 may be shaped complementary to the notch 126. The protruding edge 114 may engage, or abut, the bottom surface 142 of the body 128. Additionally, or alternatively, the protruding edge 114 may engage, or abut, the rim 136 within the notch 126.

The liner 104 may further include a raised portion 158 unitarily formed with the liner 104. The raised portion 158 may extend vertically upward from the liner 104. Additionally, or alternatively, the raised portion 158 may engage, or abut, the body 128 of the housing 120. The rim 136 may have a first depth D1. The raised portion 158 of the liner 104 may have a second depth D2 that is about equal to the first depth D1; therefore, the rim 136 may extend through the keyed aperture 110 such that the rim 136 extends less than the second depth D2 past the liner 104. The liner 104 may further define a plurality of recesses 116. More specifically, the liner edge 118 may define the plurality of recesses 116. The plurality of recesses 116 may align with noncontinuous portions of the rim 136, as illustrated in the example of FIG. 6.

Advantageously, the system of locating a lighting assembly in an appliance described herein allows for manufacturers to assembly the appliance with relative ease. The lighting assembly aligns with the keyed aperture of the liner of the appliance via the lateral locator and the rim such that the lighting assembly couples with the liner more rigidly. Additionally, the lighting assembly minimizes gap distances between the lighting assembly and the liner to present a more finished and elegant appearance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A refrigerator appliance comprising:
- a cabinet;
- a liner disposed within the cabinet, wherein the liner defines:
  - a keyed aperture; and
  - a lateral slot; and
- a lighting assembly disposed within the cabinet, the lighting assembly comprising:
  - a housing comprising:
    - a body extending laterally between a first end and a second end;
    - a rim coupled with the body, wherein the rim extends laterally between the first end and the second end, wherein the rim is configured to be received by the keyed aperture, wherein the rim received by the keyed aperture restricts transverse movement of the housing; and
    - a lateral locator extending from the body toward the liner, wherein the lateral locator is configured to be received by the keyed aperture to restrict lateral movement of the housing; and
- a light coupled with the housing; wherein the liner comprises a raised portion that abuts the body of the housing, the body of the housing being located between the liner and the cabinet.

2. The refrigerator appliance of claim 1, wherein the rim further comprises a projection received by the keyed aperture to restrict rotational movement of the housing.

3. The refrigerator appliance of claim 2, wherein the projection spaces the rim from the liner.

4. The refrigerator appliance of claim 2, wherein the projection abuts the liner within the keyed aperture.

5. The refrigerator appliance of claim 1, wherein the rim defines a notch.

6. The refrigerator appliance of claim 5, wherein the liner includes a protruding edge that operably extends into the notch.

7. The refrigerator appliance of claim 5, wherein the notch is proximal the first end of the body.

8. The refrigerator appliance of claim 1, wherein the body engages the liner to resist vertical movement of the housing.

9. The refrigerator appliance of claim 1, wherein the body of the housing defines an access port.

10. The refrigerator appliance of claim 1, wherein the lateral locator abuts the liner within the keyed aperture.

11. The refrigerator appliance of claim 1, wherein the lateral locator comprises:
- a first tab coupled with the body; and
- a second tab coupled with the body, wherein the second tab is spaced from the first tab.

12. A lighting assembly for a refrigerator, the refrigerator comprising a cabinet, a liner disposed within the cabinet, wherein the liner defines a keyed aperture, the lighting assembly comprising:
- a housing disposed within the cabinet, the housing comprising:
  - a body extending laterally between a first end and a second end;
  - a rim coupled with the body, wherein the rim extends laterally between the first end and the second end, wherein the rim is configured to be received by the keyed aperture, wherein the rim received by the keyed aperture remains static relative to the liner along a transverse direction and a first rotational direction; and
  - a lateral locator extending from the body toward the liner, wherein the lateral locator is configured to be received by the keyed aperture remains static relative to the liner along a lateral direction; and
- a light coupled with the housing; wherein the liner comprises a raised portion that abuts the body of the housing, the body of the housing being located between the liner and the cabinet.

13. The lighting assembly of claim 12, wherein the lateral locator comprises:
- a first tab coupled with the body; and
- a second tab coupled with the body, wherein the second tab is spaced from the first tab.

14. The lighting assembly of claim 13, wherein the first tab and the second tab laterally abut the liner within the keyed aperture.

15. The lighting assembly of claim 12, wherein the rim is received by the keyed aperture such that the housing remains rotationally static relative to the liner.

16. The lighting assembly of claim 12, wherein the body engages the liner to remain static in a vertical direction relative to the liner.

17. The lighting assembly of claim 12, wherein the rim further comprises at least one projection that assists the housing to remain static relative to the liner in the transverse direction.

18. The refrigerator of claim 17, wherein the at least one projection of the rim abuts the liner within the keyed aperture.

* * * * *